(12) United States Patent
Moreland

(10) Patent No.: US 6,425,554 B1
(45) Date of Patent: Jul. 30, 2002

(54) BOTTOM DISCHARGE DRAINMAST FOR AN AIRCRAFT

(75) Inventor: Thomas R. Moreland, Diamond, OH (US)

(73) Assignee: The B. F. Goodrich Company, Charlotte, NC (US)

( * ) Notice: Subject to any disclaimer, the term of this patent is extended or adjusted under 35 U.S.C. 154(b) by 0 days.

(21) Appl. No.: 09/756,397

(22) Filed: Jan. 8, 2001

Related U.S. Application Data

(60) Provisional application No. 60/239,727, filed on Oct. 12, 2000.

(51) Int. Cl.[7] ................................................. B64D 1/00
(52) U.S. Cl. ...................... 244/136; 244/118.5; 244/1 R
(58) Field of Search .............................. 244/136, 118.5, 244/129.1, 1 R; 114/364, 125, 185; 239/125, 130, 103, 171

(56) References Cited

U.S. PATENT DOCUMENTS

| | | | | |
|---|---|---|---|---|
| 3,911,848 A | * | 10/1975 | Brazier | 114/185 |
| 4,202,061 A | | 5/1980 | Waters | 4/317 |
| 5,104,069 A | * | 4/1992 | Reising | 244/136 |
| 5,290,996 A | | 3/1994 | Giamati et al. | 219/201 |
| 5,552,576 A | | 9/1996 | Giamati | 219/201 |
| 5,655,732 A | | 8/1997 | Frank | 244/1 R |
| 5,996,938 A | * | 12/1999 | Simonetti | 244/129.1 |

OTHER PUBLICATIONS

International Search Report (PCT/ISA/210).

\* cited by examiner

Primary Examiner—Peter M. Poon
Assistant Examiner—Timothy D Collins
(74) Attorney, Agent, or Firm—Renner, Otto, Boisselle & Sklar, LLP

(57) ABSTRACT

A drainmast (10) for discharging liquid from a moving aircraft (12). The drainmast (10) includes a fairing (20) having a mounting flange (24), a flow-controlling cap (26), and an aerodynamically advantageous mast (28) extending therebetween. The flow-controlling cap (26) has a lower surface defining an airflow-redirecting zone, a liquid-release zone, and a liquid-recirculation zone. The redirecting zone is shaped to redirect airflow (A) into the release zone in a direction parallel to the discharge direction (D) of the drain tube (22). The release zone is shaped to encourage the redirected airflow ($A_{redir}$) to sweep a substantial portion of the released liquid away from the fairing in a primary flow path (L). The recirculation zone captures escaped liquid from the release zone and recirculates this escaped liquid back into the release zone in recirculation flow path ($L_{rec1}$). The rear and side surfaces of the cap (26) may include a continuous groove (66) aligned with the airflow direction A. The groove (66) defines a second recirculation zone which captures liquid escaping from the primary flow path upstream of the recirculation zone and/or liquid escaping from the first recirculation zone, and which directs the captured liquid into a secondary flow path ($L_{sec}$), into the primary flow path (L), and/or into the first recirculation zone.

22 Claims, 2 Drawing Sheets

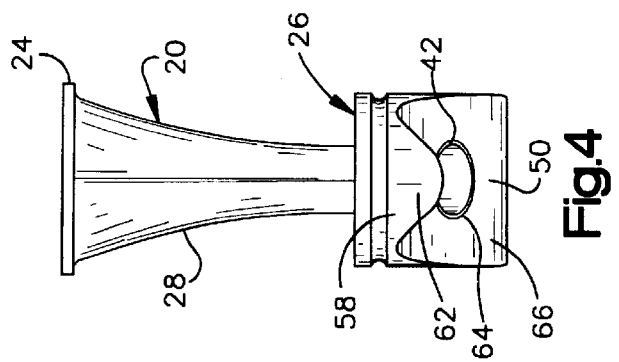
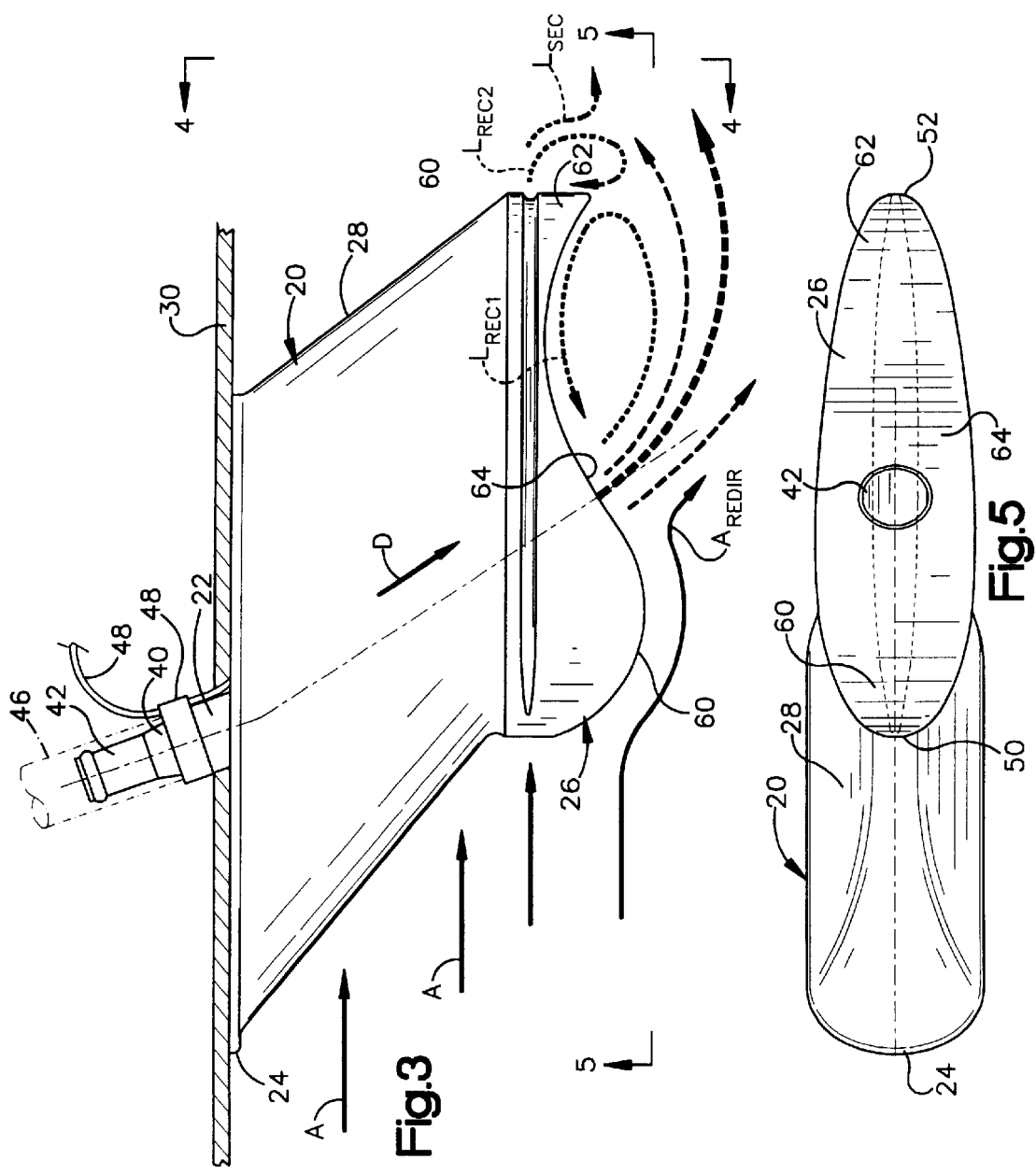

BOTTOM DISCHARGE DRAINMAST FOR AN AIRCRAFT

RELATED APPLICATIONS

This application claims priority under 35 U.S.C. §119(e) to U.S. Provisional Patent Application No. 60/239,727 filed on Oct. 12, 2000 and entitled BOTTOM DISCHARGE DRAINMAST FOR AN AIRCRAFT. The entire disclosure of this provisional application is hereby incorporated by reference.

FIELD OF THE INVENTION

This invention relates generally as indicated to a bottom discharge drainmast for an aircraft and, more particularly, to a bottom discharge drainmast having at least one recirculating zone for capturing liquid which escapes from a release zone and redirecting the liquid into an appropriate flow path away from the drainmast.

BACKGROUND OF THE INVENTION

A drainmast is used to eject waste liquid (e.g., water, discarded beverages, condensation, rain, etc.) from a moving aircraft. A drainmast typically comprises a fairing having a top mounting flange for attachment to the aircraft and an aerodynamically advantageous mast extending downward therefrom. A drain tube inside the fairing will usually include a top inlet end adapted for connection to an exit line of the aircraft's waste water system and an outlet positioned to release liquid in an appropriate discharge direction.

Of particular relevance to the present invention is a bottom discharge drainmast. In such a drainmast, the outlet end of the drain tube is positioned at the bottom of the fairing and so that the discharge direction will be non-parallel with the airflow direction. For example, the drain tube may be shaped and positioned so that the discharge direction is at a downward angle (e.g., 45° to 90°, 45° to 75°, 45° to 60°) relative to the expected airflow direction.

In a bottom discharge drainmast, the bottom portion, or cap, of the fairing will usually have a lower surface defining a liquid-release zone. The release zone is shaped to encourage the airflow to sweep as much as possible of the released liquid away from the fairing. The remaining liquid flows onto the outer surface of the drainmast and, if this liquid is not channeled away and/or if the drainmast surface is not sufficiently heated, ice will undesirably accumulate on the drainmast. Fins are often provided to channel the liquid to the back off of the aft end of the drain mast and heaters are provided to heat to prevent the formation of ice. Fins, by virtue of their protruding and/or high surface area geometry, are difficult to heat and require high heat density. This high heat density sometimes shortens the life of the drainmast and/or limits the materials which may be used to construct the drainmast.

SUMMARY OF THE INVENTION

The present invention provides an improved design for a bottom discharge drainmast which encourages a greater percentage of the released liquid to flow away from the drainmast in a primary flow path without the use of fins. With less water on the surface of the drainmast and no fins exposed to the surroundings, less heat will be required to prevent the formation of ice on the drainmast. With lower levels of heat being used, the drainmast is likely to last longer and a wider variety of materials, such as composites and silicon can be used to construct the drainmast.

More particularly, the present invention provides a drainmast comprising a fairing and a drain tube within the fairing. The fairing includes a flow-controlling cap having a lower surface defining an aft airflow-redirecting zone, a liquid-release zone forward of the airflow-redirecting zone, and a fore liquid-recirculation zone. The redirecting zone is shaped to redirect the airflow into the release zone in a direction parallel to the discharge direction. The release zone is shaped to encourage the redirected airflow to sweep a substantial portion of the released liquid away from the fairing in a primary flow path. The recirculation zone is shaped to capture escaped liquid from the release zone and to recirculate the escaped liquid back into the release zone.

The lower surface of the flow-controlling cap may include an aft concave portion defining the airflow redirecting zone, a fore convex portion defining the liquid-recirculating zone, and a transition portion therebetween defining the liquid-release zone. The aft portion may have a convex shape when viewed from the side and a half-oval shape when viewed from the bottom. The fore portion may have a concave shape when viewed from the side and a parabola shape when viewed from the bottom. The transition portion may have a trapezoid shape when viewed from the side and a roughly rectangular shape when viewed from the bottom.

The flow-controlling portion may have rear and side surfaces defining a second recirculation zone which is shaped to capture liquid which escapes from the primary flow path upstream of the recirculation zone and/or liquid which escapes from the first recirculation zone. This second recirculation zone may be shaped to direct the captured liquid into a secondary flow path, into the primary flow path, and/or into the first recirculation zone and may comprise a continuous groove positioned parallel to the expected airflow direction.

These and other features of the invention are fully described and particularly pointed out in the claims. The following descriptive annexed drawings set forth in detail a certain illustrative embodiment of the invention, this embodiment being indicative of but one of the various ways in which the principles of the invention may be employed.

DRAWINGS

FIGS. 3, 4 and 5 are side, front, and bottom views, respectively, of the drainmast.

DETAILED DESCRIPTION

Figure 1:
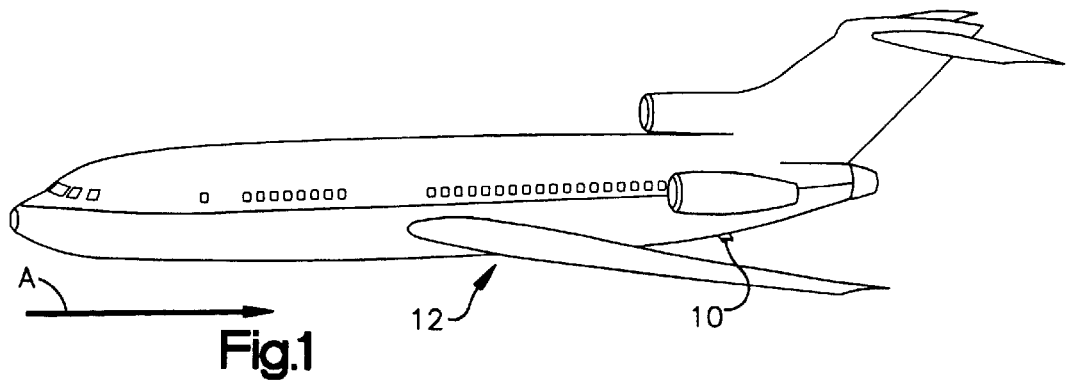
FIG. 1 is a schematic view of a drainmast according to the present invention installed on an aircraft.

Referring now to the drawings in detail, and initially to FIG. 1, a drainmast 10 according to the present invention is shown installed on an aircraft 12. The aircraft 12 has a waste water system wherein liquid is accumulated until it reaches a certain volume and then the accumulated waste liquid is released from the system via the drainmast 10. As is explained in more detail below, the drainmast 10 is designed to optimally use the airflow A to sweep a significant percentage of the released liquid away from its outer surface.

Figure 2:
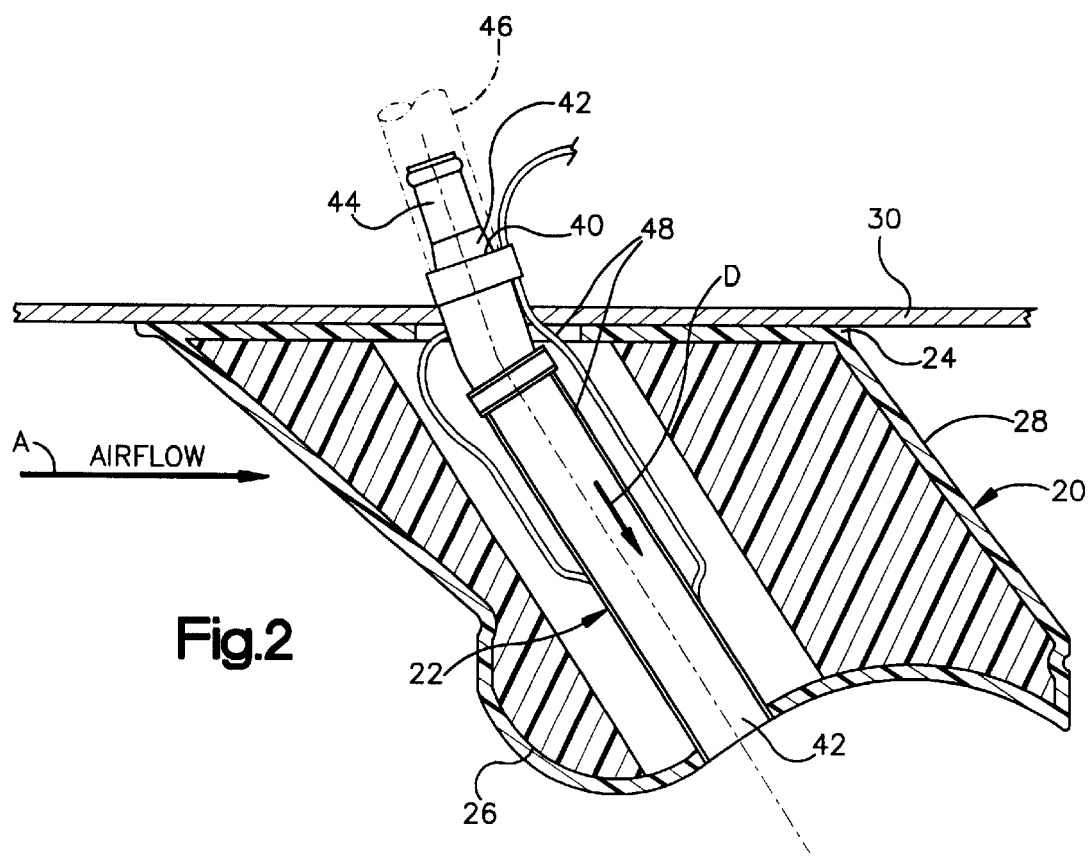
FIG. 2 is a sectional view of the drainmast.

Referring now additionally to FIG. 2, the drainmast 10 comprises a fairing 20 and a drain tube 22. The illustrated fairing 20 is a one piece fairing that is formed by, for example, resin transfer molding. However, a multi-piece fairing is certainly possible with, and contemplated by, the present invention. Additionally or alternatively, since the drainmast 10 may require less heating for ice prevention purposes, a wider variety of materials may be used to construct the drainmast such as, for example, composites and silicons.

The illustrated drainmast 10 includes a mounting flange 24, a bottom flow-controlling cap 26, and a mast 28 extending therebetween. The mounting flange 24 is adapted for attachment to the aircraft 12 and, in the illustrated embodiment, is attached to a bottom mounting surface 30 of the aircraft's fuselage. For aerodynamic advantages, the mast 28 is swept and wing shaped and tapers from the mounting flange 20 into the exit cap 26, as is best seen by referring briefly and additionally to FIGS. 4 and 5. The fairing mounting flange 24, the cap 26, and the mast 28 define a foam-filled cavity in which the drain tube 22 is positioned.

The drain tube 22 is made of a metallic material, such as stainless steel, and has an inlet 40 and an outlet 42. The inlet 40 is coupled to an adapter 44 for connection with an outlet 46 of the aircraft waste water system. In the illustrated bottom discharge drainmast 10, the drain tube 22 bends downward of its inlet 40 so that its axis, or discharge direction D, at its outlet 42 is at a downward angle (e.g., 45° to 90°, 45° to 75°, 45° to 60°) relative to the expected airflow direction A. An electric heater 48 may be provided to prevent freezing of the waste water as it passes through the drain tube.

Referring now to FIGS. 3–5, the fairing cap 26 comprises a front wall 50, a rear wall 52, side walls 54, and a bottom wall 56. These walls define an aft portion 60, a fore portion 62, and a transition portion 64 therebetween. A continuous groove 66 is formed in the rear wall 52 and the side walls 54 (but not the front wall 50) and this groove 66 is positioned substantially parallel with the expected airflow direction A.

The front and bottom surfaces of the convex aft portion 60 (e.g., the front wall 50 and an aft section of the bottom wall 56) define an airflow-redirecting zone. The bottom surface of the concave fore portion 62 (e.g., a fore section of the bottom wall 56) define a liquid-recirculating zone. The bottom surface of the transition portion 64 (e.g., the section of the bottom wall 56 between the aft and fore sections) defines a liquid-release zone. The outlet 42 of the drain tube 22 is positioned to discharge the liquid into the liquid-release zone.

The redirecting zone is shaped to redirect the airflow A into the release zone in a redirected airflow direction $A_{redir}$ parallel to the discharge direction D. The release zone is shaped to encourage the redirected airflow $A_{redir}$ to sweep a significant percentage of the released liquid away from the fairing in a primary liquid flow path L. The recirculation zone is shaped to capture liquid which escapes from the release zone to recirculate the escaped liquid back into the release zone in a first recirculation flow path $L_{rec1}$. In this manner, a predominant percentage of the released liquid is swept away from the drainmast 10 either initially or upon recirculation.

The groove 66 forms a second recirculation zone which is shaped to capture liquid which escapes from the primary liquid flow path L upstream of the recirculation zone and/or liquid which escapes from the first recirculation zone. The captured liquid is then swept away from the drainmast 10 (or into the primary flow path L) in a secondary flow path $L_{sec}$ and/or is directed into the first recirculation zone in a second recirculation flow path $L_{rec2}$.

While the geometry of the illustrated fairing cap 26 is best described by referring to the drawings, it may be noted that the aft portion 60 has a convex shape when viewed from the side (FIG. 3) and a half-oval shape when viewed from the bottom (FIG. 5). The fore portion 62 has a concave shape when viewed from the side (FIG. 3) and a parabola shape when viewed from the bottom (FIG. 5). The transition portion 64 has a three-right-angle trapezoid shape when viewed from the side (FIG. 3) and a roughly rectangular shape when viewed from the bottom (FIG. 5). The rounded front wall 50 is sharper and wider than the rounded rear wall 52 (FIG. 3) and is vertically positioned above the "hump" of the convex aft portion 60 and the transition portion 64 (FIG. 4).

One may now appreciate that the present invention provides an improved design for a bottom discharge drainmast 10 which encourages a greater percentage of the released liquid to flow away from the drainmast 10 without the use of fins. Although the invention has been shown and described with respect to certain preferred embodiments, it is obvious that equivalent and obvious alterations and modifications will occur to others skilled in the art upon the reading and understanding of this specification. The present invention includes all such alterations and modifications and is limited only by the scope of the following claims.

What is claimed is:

1. A drainmast for discharging liquid from a moving aircraft, comprising a fairing and a drain tube within the fairing;

the fairing including a mounting flange, a flow-controlling cap, and a mast extending therebetween;

the mounting flange being adapted for attachment to the aircraft;

the mast being aerodynamically advantageously shaped relative to an expected airflow direction;

the flow-controlling cap having a lower surface defining an aft airflow-redirecting zone, a liquid-release zone forward of the airflow-redirecting zone, and a fore liquid-recirculation zone;

the drain tube including an inlet adapted for connection to an waste water exit line of the aircraft and an outlet positioned to release liquid in a discharge direction into the liquid-release zone;

the redirecting zone being shaped to redirect the airflow into the release zone in a direction parallel to the discharge direction;

the release zone being shaped to encourage the redirected airflow to sweep a substantial portion of the released liquid away from the fairing in a primary flow path; and the recirculation zone being shaped to capture escaped liquid from the release zone and to recirculate the escaped liquid back into the release zone.

2. A drainmast as set forth in claim 1, wherein the lower surface of the flow-controlling cap includes an aft concave portion defining the airflow redirecting zone, a fore convex portion defining the liquid-recirculating zone, and a transition portion therebetween defining the liquid-release zone.

3. A drainmast as set forth in claim 1, wherein the drain tube is shaped and positioned so that the discharge direction is at a 45° to 90° downward angle relative to the expected airflow direction.

4. A drainmast as set forth in claim 3, wherein the drain tube is shaped and positioned so that the discharge direction is at a 45° to 75° downward angle relative to the expected airflow direction.

5. A drainmast as set forth in claim 4, wherein the drain tube is shaped and positioned so that the discharge direction is at a 45° to 60° downward angle relative to the expected airflow direction.

6. A drainmast as set forth in claim 1, wherein the fairing's flow-controlling portion has rear and side surfaces defining a second recirculation zone which is shaped to capture liquid which escapes from the primary flow path upstream of the recirculation zone and/or liquid which escapes from the lower recirculation zone.

7. A drainmast as set forth in claim 6, wherein the second recirculation zone is shaped to direct the captured liquid into a secondary flow path, into the primary flow path, and/or into the first recirculation zone.

8. A drainmast as set forth in claim 7, wherein the second recirculation zone comprises a continuous groove formed in the rear and side surfaces.

9. A drainmast as set forth in claim 8, wherein the groove is positioned parallel to the expected airflow direction.

10. A drainmast as set forth in claim 1, wherein the cap comprises:
    an aft portion having a convex shape when viewed from the side and a half-oval shape when viewed from the bottom;
    a fore portion having a concave shape when viewed from the side and a parabola shape when viewed from the bottom; and
    a transition portion therebetween having a trapezoid shape when viewed from the side and a roughly rectangular shape when viewed from the bottom;
    wherein the aft portion defines the airflow redirecting zone, the fore portion defines the liquid-recirculating zone, and the transition portion defines the liquid-release zone.

11. In combination, an aircraft, and the drainmast of claim 1 mounted to the aircraft.

12. A method of discharging fluid from a moving aircraft, said method comprising the steps of:
    discharging liquid from a drain tube in a discharge direction into a release zone;
    redirecting airflow into the release zone in a direction substantially parallel to the discharge direction;
    sweeping a substantial portion of the released liquid away from the aircraft in a primary flow path; and
    capturing liquid which escapes from the release zone in a first recirculation zone; and
    recirculating the escaped liquid back into the release zone whereby it may be swept way from the aircraft in the primary flow path.

13. A method as set forth in claim 12, further comprising the steps of capturing liquid which escapes from the primary flow path upstream of the first recirculation zone and/or liquid which escapes from the first recirculation zone in a second recirculation zone.

14. A method as set forth in claim 13, further comprising the steps of directing the liquid from the second recirculation zone into a secondary flow path, into the primary flow path, and/or into the first recirculation zone.

15. A drainmast for discharging liquid from a moving aircraft, comprising a fairing and a drain tube within the fairing;
    the fairing defining an airflow-redirecting zone, a liquid-release zone, and liquid-recirculation zone;
    the drain tube including an inlet adapted for connection to an exit line of a waste water system of the aircraft and an outlet positioned to release liquid in a discharge direction into the liquid-release zone;
    the airflow-redirecting zone being shaped and positioned to redirect the airflow into the release zone in a direction parallel to the discharge direction;
    the liquid-release zone being shaped and positioned to encourage the redirected airflow to sweep a substantial portion of the released liquid away from the fairing in a primary flow path; and
    the liquid-recirculation zone being shaped and positioned to capture escaped liquid and recirculate it back into the primary flow path.

16. A drainmast as set forth in claim 15, wherein the lower surface of the fairing includes an aft convex portion defining the airflow redirecting zone.

17. A drainmast as set forth in claim 16, wherein the lower surface of the fairing includes a fore concave portion defining the liquid-recirculating zone.

18. A drainmast as set forth in claim 17, wherein the lower surface of the fairing including a transition portion between the convex portion and the concave portion and wherein this transition portion defines the liquid-release zone.

19. A drainmast as set forth in claim 15, wherein the fairing has rear and side surfaces defining the recirculation zone.

20. A drainmast as set forth in claim 19, wherein the recirculation zone comprises a continuous groove in the front and side surfaces.

21. A drainmast as set forth in claim 20, wherein the groove is positioned parallel to the expected airflow direction.

22. A drainmast for discharging liquid from a moving aircraft, comprising a fairing and a drain tube within the fairing;
    the fairing defining an airflow-redirecting zone, a liquid-release zone, a first liquid-recirculation zone, and a second liquid-recirculation zone;
    the drain tube including an inlet adapted for connection to an exit line of a waste water system of the aircraft and an outlet positioned to release liquid in a discharge direction into the liquid-release zone;
    the airflow-redirecting zone being shaped and positioned to redirect the airflow into the release zone in a direction parallel to the discharge direction;
    the liquid-release zone being shaped and positioned to encourage the redirected airflow to sweep the released liquid away from the fairing in a primary flow path; and
    the liquid-recirculation zones being shaped and positioned to capture liquid which escapes from the primary flow path and recirculate it back into the primary flow path.

* * * * *